A. W. OLDS.
APPARATUS FOR OPERATING AUTOMOBILE SIGNS.
APPLICATION FILED JAN. 23, 1917.
1,311,135.
Patented July 22, 1919.
2 SHEETS—SHEET 2.
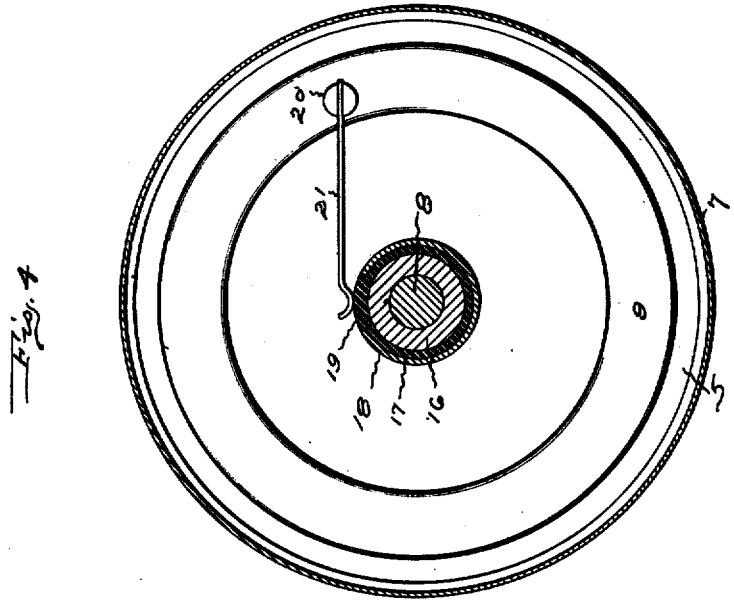
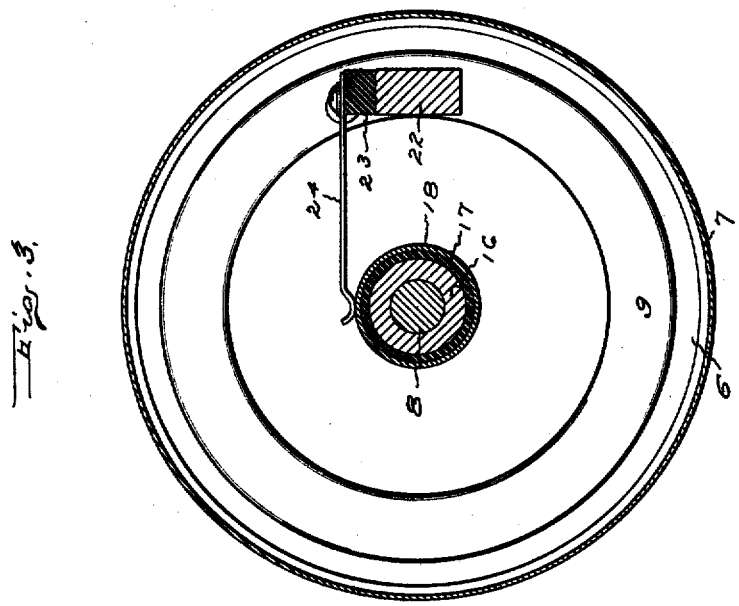
INVENTOR.
Alfred W. Olds
BY
Harry R. Williams
ATTORNEY.

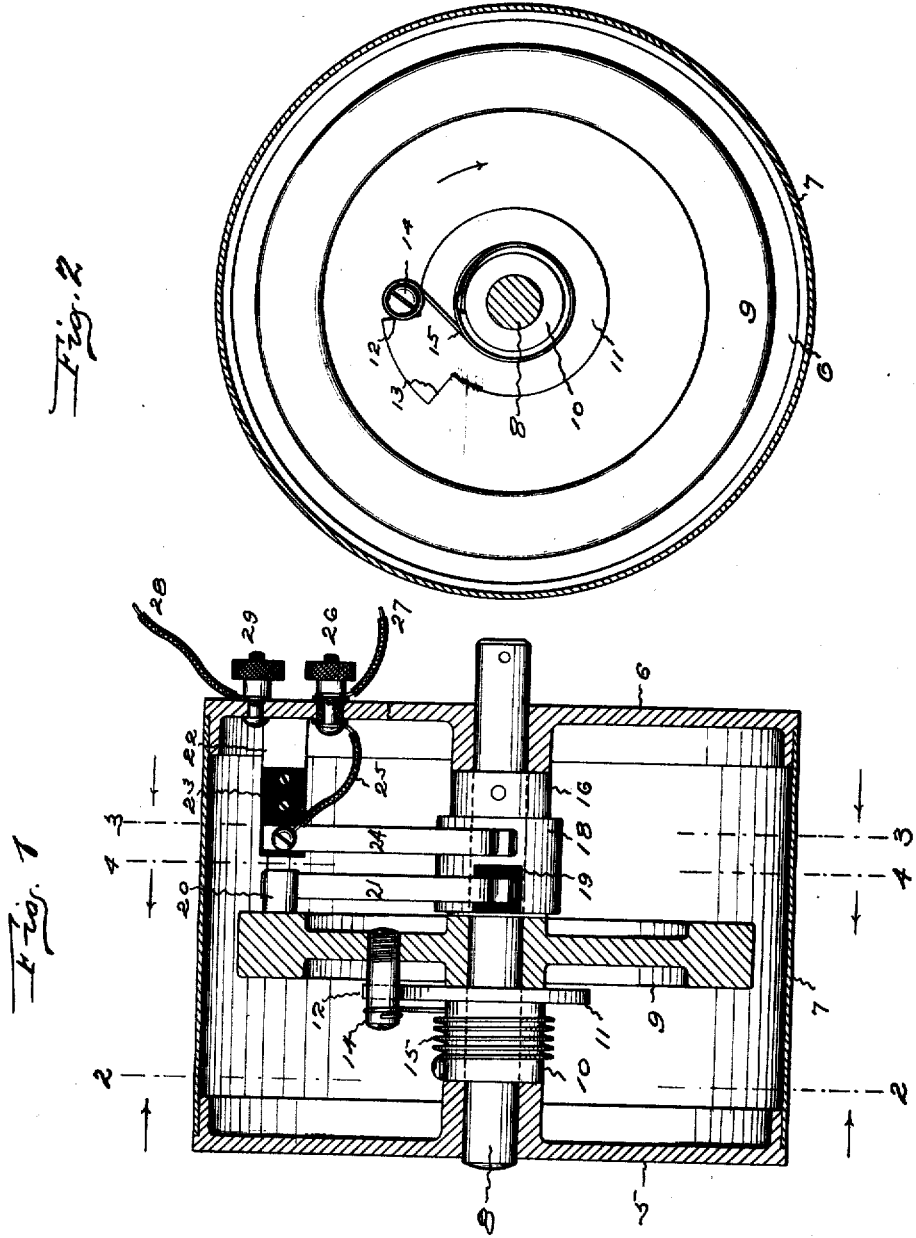

UNITED STATES PATENT OFFICE.

ALFRED W. OLDS, OF WINDSOR, CONNECTICUT.

APPARATUS FOR OPERATING AUTOMOBILE-SIGNS.

1,311,135.   Specification of Letters Patent.   Patented July 22, 1919.

Application filed January 23, 1917.   Serial No. 143,994.

*To all whom it may concern:*

Be it known that I, ALFRED W. OLDS, a citizen of the United States, residing at Windsor, in the county of Hartford and State of Connecticut, have invented a new and useful Improvement in Apparatus for Operating Automobile-Signs, of which the following is a specification.

This invention relates to an apparatus which is intended to be located on pleasure and commercial automobiles, trolley and tram cars, and similar vehicles, for controlling a sign or other warning signal designed to show a change in the rate of speed of the vehicle.

The object of the invention is to provide a very simple and effective apparatus which will make the necessary changes in an electrical circuit as the speed of the vehicle varies to cause the sign or other warning signal, which is connected in or actuated by the electrical circuit, to indicate such alteration in the speed of the vehicle.

In attaining this end a weighted member, fly wheel or pulley is loosely mounted on a shaft which is designed to be connected with and rotated by some moving part of the vehicle. The fly wheel and shaft normally rotate together at the same rate of speed except when the speed of the shaft is being retarded and then the fly wheel has a tendency, owing to its momentum, to continue and rotate faster than the shaft. Electrical connections from a circuit designed to operate the sign or signal are so arranged that when the fly wheel and shaft are rotated at the same rate of speed the circuit will be open, but when the shaft slows down and the fly wheel runs ahead the connections will close the circuit and the sign or signal will be operated to indicate that the vehicle is slowing down.

Figure 1 of the accompanying drawings is a longitudinal section of a form of apparatus which embodies the invention. Fig. 2 shows a transverse section on the plane indicated by the dotted line 2—2 on Fig. 1 looking in the direction indicated by the arrows. Fig. 3 is a transverse section on the plane indicated by the dotted line 3—3 on Fig. 1. Fig. 4 is a transverse section on the plane indicated by the dotted line 4—4 on Fig. 1 looking in the direction indicated by the arrows.

The apparatus is inclosed in a casing which is illustrated as having a circular head 5 at one end and a circular head 6 at the other end, these being connected by a cylindrical shell 7. This casing is designed to be secured in a fixed position to any convenient part of the frame of the vehicle with which the apparatus is to be used.

Rotatably mounted in bearings at the centers of the heads is a shaft 8 which is designed to be connected by any suitable means with any moving part of the vehicle, as a wheel or axle, or transmission or drive shaft. Loosely mounted on the shaft is a fly wheel or weighted pulley 9. Fixed to the shaft on one side of the fly wheel is a sleeve 10 with a plate 11 which has a stop shoulder 12 and a stop shoulder 13, and connected between a stud 14 that is screwed into the fly wheel and with the sleeve that is fixed to the shaft is a light coil spring 15. When the shaft rotates forwardly the shoulder 12 of the plate 11 engages the stud 14 so as to drive the fly wheel with the shaft. When the shaft slows down the momentum of the fly wheel drives it ahead of the shaft and tends to tighten the spring. The fly wheel can, however, turn in advance of the shaft only until the stud 14 engages the shoulder 13 on the plate 11. When the excess momentum of the moving fly wheel is overcome, that is, when the fly wheel again only turns as fast as the shaft, the spring returns it so that the stud 14 rests against the shoulder 12 on the plate 11.

On the other side of the fly wheel and fixed to the shaft is a commutator 16 comprising an insulating bushing 17 on which is a conducting sleeve 18. Adjacent to the pulley the conducting sleeve has a portion cut away and in this cut away portion is a block of insulation 19. Projecting from the fly wheel is a stud 20 to which is fixed one end of a brush 21. When the fly wheel and the shaft are stationary, or are rotating at the same rate of speed, the free end of this brush rests upon the insulating block 19 of the commutator. When the speed of rotation of the fly wheel is faster than the shaft this brush moves off from the insulating section of the commutator onto the conducting section.

On a lug 22 that extends inwardly from the head 6 is an insulating block 23, and fastened to this block is one end of a brush 24. The other end of the brush bears all the time on the conducting portion of the commutator which is fixed to the shaft. The brush 24 is by a link 25 connected with a binding post 26. One of the circuit wires 27 is connected with this binding post and the other circuit wire 28 is connected with the binding post 29 that is grounded on the apparatus. These circuit wires may lead to any available source of power and to any desired sign or signaling apparatus which may be located on the vehicle in convenient position to be observed.

When the shaft and fly wheel are stationary or are rotating at the same speed the brush 21 which turns with the fly wheel rests upon the insulating section of the commutator, but when the fly wheel travels faster than the shaft this brush is moved off from the insulation and onto the commutator. This closes the circuit from the brush 21 to the conducting portion of the commutator and stationary brush 24, so that the sign or signaling apparatus will be set to show that the speed of the vehicle is being reduced.

The invention claimed is:

1. An apparatus for causing the operation of a vehicle speed signal having a casing designed to be fixed on the vehicle, a shaft supported by the casing and adapted to be rotated from a moving part of the vehicle, a rotatable weighted member loosely mounted on the shaft and adapted to be rotated thereby, a conducting brush carried by the weighted member, a conducting brush fixed to the casing, and a commutator rotatable with the shaft and engaged by said brushes.

2. An apparatus for causing the operation of a vehicle speed signal having a casing designed to be fixed on the vehicle, a shaft supported by the casing and adapted to be rotated from a moving part of the vehicle, a rotatable weighted member loosely mounted on the shaft and adapted to be rotated thereby, a conducting brush carried by the weighted member, a conducting brush fixed to the casing, and a commutator carried by the shaft and engaged by said brushes.

3. An apparatus for causing the operation of a vehicle speed signal having a casing designed to be fixed on the vehicle, a shaft supported by the casing and adapted to be rotated from a moving part of the vehicle, a rotatable weighted member loosely mounted on the shaft and adapted to be rotated thereby, a spring connecting the weighted member and the shaft, a commutator fixed to and rotatable with the shaft, a conducting brush carried by the weighted member and normally resting on an insulating section of the commutator, and a conducting brush fixed to the casing and bearing on a conducting section of the commutator.

ALFRED W. OLDS.